(12) United States Patent
Meleis et al.

(10) Patent No.: US 7,782,931 B2
(45) Date of Patent: Aug. 24, 2010

(54) METHODS, SYSTEMS, AND COMPUTER PROGRAM PRODUCTS FOR AUTOMATIC DETECTION OF AN INCORRECT DIGITAL SUBSCRIBER LINE MODEM AND FILTER CONFIGURATION AT A CUSTOMER PREMISES

(75) Inventors: Hanafy Meleis, Weston, FL (US); Sameh Yamany, Plano, TX (US); Mohamed Battisha, Plantation, FL (US); Ayman Eldeib, Sunrise, FL (US)

(73) Assignee: NetTraffic, Inc., Frisco, TX (US)

( * ) Notice: Subject to any disclaimer, the term of this patent is extended or adjusted under 35 U.S.C. 154(b) by 541 days.

(21) Appl. No.: 11/842,238

(22) Filed: Aug. 21, 2007

(65) Prior Publication Data

US 2008/0101448 A1 May 1, 2008

Related U.S. Application Data (60) Provisional application No. 60/862,903, filed on Oct. 25, 2006.

(51) Int. Cl.
*H04B 1/38* (2006.01)
*H04B 3/46* (2006.01)

(52) U.S. Cl. .................. 375/222; 375/225

(58) Field of Classification Search .............. 375/222, 375/223, 224, 225; 379/32.04, 399.01; 370/485
See application file for complete search history.

(56) References Cited

U.S. PATENT DOCUMENTS

| 6,014,425 | A | 1/2000 | Bingel et al. |
| 2008/0049641 | A1* | 2/2008 | Edwards et al. ............ 370/253 |
| 2008/0052394 | A1* | 2/2008 | Bugenhagen et al. ....... 709/224 |

OTHER PUBLICATIONS

International Search Authority International Search Report and Written Opinion for PCT Application PCT/US2007/022010 mailed Apr. 21, 2008.

* cited by examiner

*Primary Examiner*—Don N Vo
(74) *Attorney, Agent, or Firm*—Myers Bigel Sibley & Sajovec, P.A.

(57) ABSTRACT

A communication network is operated by collecting data rate information for at least one Digital Subscriber Line (DSL), comparing the collected data rate information with a provisioned data rate associated with the at least one DSL, resetting the at least one DSL if the collected data rate information for the at least one DSL is less than the provisioned data rate associated with the at least one DSL, performing a statistical analysis on time the at least one DSL operates at about the provisioned data rate versus time the at least one DSL operates below the provisioned data rate, and determining whether the at least one DSL has an impedance problem based on the statistical analysis.

19 Claims, 7 Drawing Sheets

METHODS, SYSTEMS, AND COMPUTER PROGRAM PRODUCTS FOR AUTOMATIC DETECTION OF AN INCORRECT DIGITAL SUBSCRIBER LINE MODEM AND FILTER CONFIGURATION AT A CUSTOMER PREMISES

RELATED APPLICATION

This application claims the benefit of and priority to U.S. Provisional Patent Application No. 60/862,903, filed Oct. 25, 2006, the disclosure of which is hereby incorporated herein by reference as if set forth in its entirety.

FIELD OF THE INVENTION

The present invention relates to communication networks and methods of operating the same, and, more particularly, to methods, system, and computer program products for verifying the configuration of digital subscriber line (DSL) customer premises equipment.

BACKGROUND OF THE INVENTION

Digital subscriber line (DSL) technology is use to transmit data at broadband transmission rates over existing voice-grade telephone lines. With electrical signals transmitted over a copper wire line, the use of higher frequencies to support higher speed services also results in a shorter loop reach. This is because high frequency signals transmitted over metallic loops attenuate energy faster than the lower frequency signals. DSL service is, therefore, typically limited to lines that are less than 18,000 feet from the central office. The available data rate is generally a function of the distance from the central office. That is, the longer the line, the lower the date rate. A typical data rate may range from between about 144 Kbps to about 4 Mbps.

DSL is a physical layer protocol. The modulation techniques used to provide DSL services enable the higher data rates. If voice service is provided on the same line as the DSL broadband service, then a filter or splitter is installed at the customer premises end of the line. The filter is used to separate the low frequency portion of the spectrum, which is used to carry the voice, from the higher frequency portion of the spectrum, which is used to provide broadband data services. The DSL line terminates on a DSL Access Multiplexer (DSLAM). The DSLAM terminates multiple subscriber lines and splits off the voice traffic from the data traffic.

When connecting the DSL modem to the DSLAM/central office, the phase locked loops at both ends automatically synchronize. The speed of the link depends on the clock rate at which both ends are able to synchronize at. In particular, the synchronization rate depends on the noise on the line, which is a function of line impedance. The more noise or impedance, the lower the data rate.

In provisioning DSL service for a customer, it is common for the customer to be provided with customer premises equipment, such as the DSL modem, filter, and possibly software to be installed on the customer's computer. Unfortunately, in self-installing the DSL modem and filter, some customer's may connect a phone to the broadband port on the filter and may connect the DSL modem to the voice port on the filter. As a result, the total impedance of the line may increase and the synchronization speed may not be capable of reaching the provisioned bit rate of the line. When a customer observes that the DSL performance is sub-standard, a call is often placed to a technical service department of the DSL service provider. The technical support person can typically talk the customer through the problem to correct the configuration of the DSL modem and filter, but such technical support requests are an expense for the service provider.

SUMMARY

In accordance with some embodiments of the present invention, a communication network is operated by collecting data rate information for at least one Digital Subscriber Line (DSL), comparing the collected data rate information with a provisioned data rate associated with the at least one DSL, resetting the at least one DSL if the collected data rate information for the at least one DSL is less than the provisioned data rate associated with the at least one DSL, performing a statistical analysis on time the at least one DSL operates at about the provisioned data rate versus time the at least one DSL operates below the provisioned data rate, and determining whether the at least one DSL has an impedance problem based on the statistical analysis.

In other embodiments, collecting data rate information comprises collecting data rate information at periodic intervals between about 15 minutes and about 1 hour.

In still other embodiments, the at least one DSL terminates on a DSL Access Multiplexer (DSLAM) and resetting the at least one DSL comprises resetting the at least one DSL without resetting the DSLAM.

In still other embodiments, the at least one DSL terminates on a DSL Access Multiplexer (DSLAM) and wherein resetting the at least one DSL comprises resetting the DSLAM.

In still other embodiments, resetting the at least one DSL comprises resetting the at least one DSL if the collected data rate information is less than a defined threshold.

In still other embodiments, performing a statistical analysis comprises performing a Bayesian statistical analysis.

In still other embodiments, performing the statistical analysis comprises performing a statistical analysis on the time the at least one DSL operates at about the provisioned data rate and time between resets of the at least one DSL.

In still other embodiments, determining whether the at least one DSL has an impedance problem comprises determining that the time that the at least one DSL operates at about the provisioned data rate is less than a first time threshold and that the time between resets of the at least one DSL is less than a second time threshold.

In still other embodiments, determining that the at least one DSL has an impedance problem comprises determining that the at least one DSL has an incorrectly installed modem and/or filter connected thereto.

Although described primarily above with respect to method embodiments of the present invention, it will be understood that the present invention may be embodied as methods, systems, and/or computer program products.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 1:
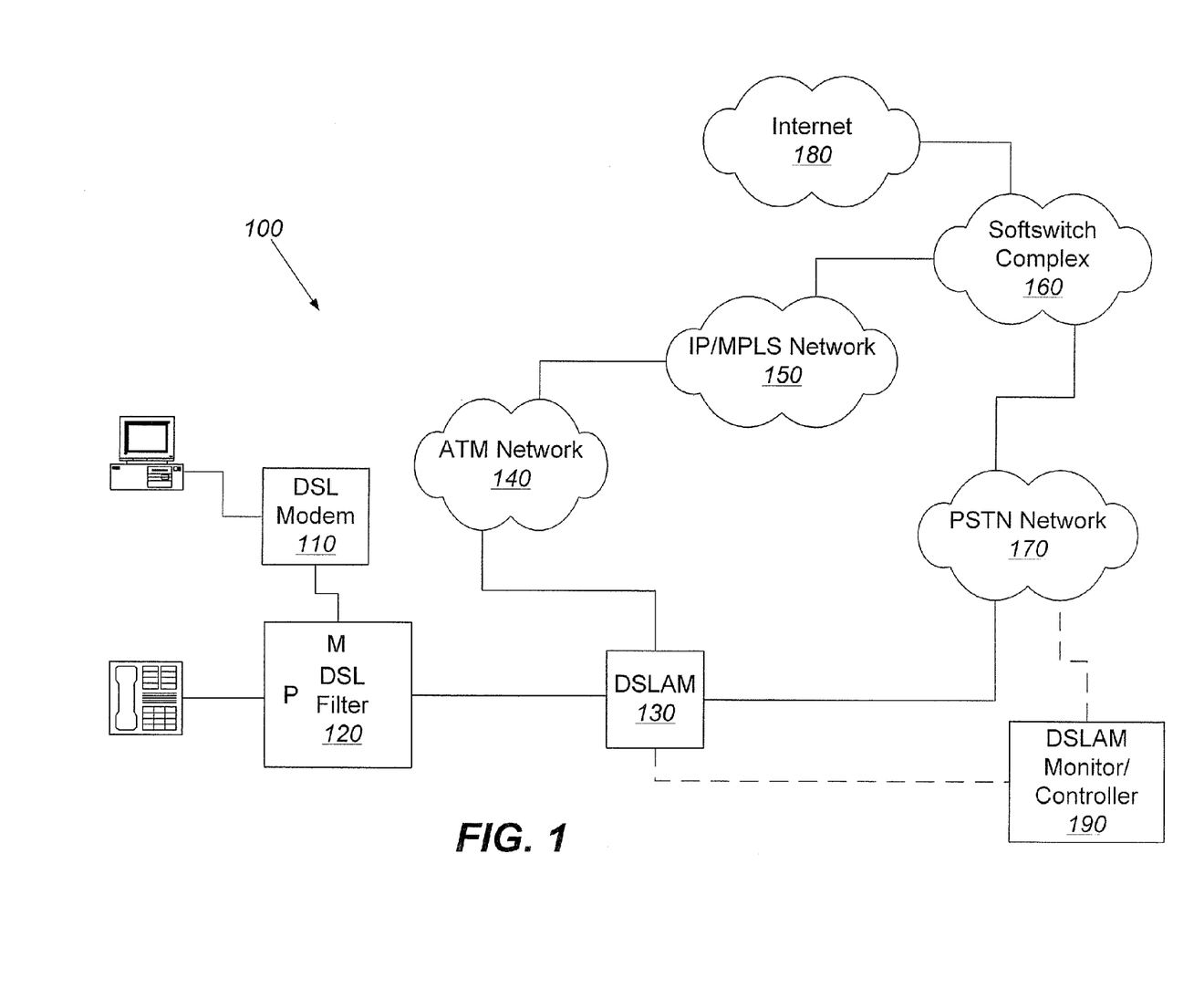
FIG. 1 illustrates a communication network that illustrates methods, systems, and computer program products for detecting an incorrect digital subscriber line (DSL) modem and filter configuration at a customer premises in accordance with some embodiments of the present invention.

Referring now to FIG. 1, an exemplary communication network 100 in which an incorrect digital subscriber line (DSL) modem and filter configuration at a customer premises can be detected, in accordance with some embodiments of the present invention, will now be described. The communication network 100 includes customer premises devices, such as a computer and analog phone, that are connected to a DSL via a DSL modem 110 and DSL filter 120, respectively. As shown in FIG. 1, the filter 120 includes a port M for connecting the DSL modem 110 to the DSL for broadband data service and a port P for connecting the phone to the DSL for voice service. As discussed above, if the DSL modem 110 and phone connections are reversed, the total impedance of the line may increase, thereby reducing the data rate provided by the DSL service. The DSL terminates at a Digital Subscriber Line Access Multiplexer (DSLAM) 130 where multiple DSL lines are typically multiplexed and the voice and data components are aggregated for transmission over the network. As shown in FIG. 1, if a customer subscribes to a data service, then the data components are aggregated for transmission over an ATM network 140, an Internet Protocol/Multiprotocol Label Switching (IP/MPLS) network 150, and a softswitch complex 160. In general, the softswitch complex 160 may provide an interface between circuit switched networks and packet switched networks, such as between the PSTN network 170 and the Internet 180. The softswitch complex 160 may comprise elements, such as a softswitch, media server, and trunk gateway that is used to established connections to the PSTN network 170. Thus, as shown in FIG. 1, voice traffic may be routed to the PSTN network via a trunk gateway while data traffic may be routed to the Internet 180. In some embodiments, voice traffic may also be routed via the Internet. Similarly, the DSLAM 130 routes the voice traffic to the PSTN network 170 for circuit switched, voice call processing.

The communication network 100 further includes a DSLAM monitor/controller 190 that, in accordance with various embodiments of the present invention, may be configured to interface directly with the DSLAM 130 or indirectly with the DSLAM through, for example, an Operations Support Service (OSS) provided in the PSTN 170. As will be discussed further below, the DSLAM monitor/controller 190 can be used to collect data on the transmission rates of the various DSL lines terminated on the DSLAM 130 and, based on patterns in the data, predict that a low transmission rate may be due to an incorrect configuration of the DSL modem 110 and the DSL filter 120, i.e., the DSL modem 110 is connected to the phone/voice port in the DSL filter 120.

Although shown as a single server, the DSLAM monitor/controller 190 may be implemented as a single server, separate servers, or a network of servers either co-located in a server farm, for example, or located in different geographic locations. The various elements of the communication network 100 may be connected by a global network, such as the Internet or other publicly accessible network. Various elements of the network may be interconnected by a wide area network, a local area network, an Intranet, and/or other private network, which may not accessible by the general public. Thus, the communication network 100 may represent a combination of public and private networks or a virtual private network. Although FIG. 1 illustrates an exemplary communication network, it will be understood that the present invention is not limited to such configurations, but is intended to encompass any configuration capable of carrying out the operations described herein.

Figure 2:
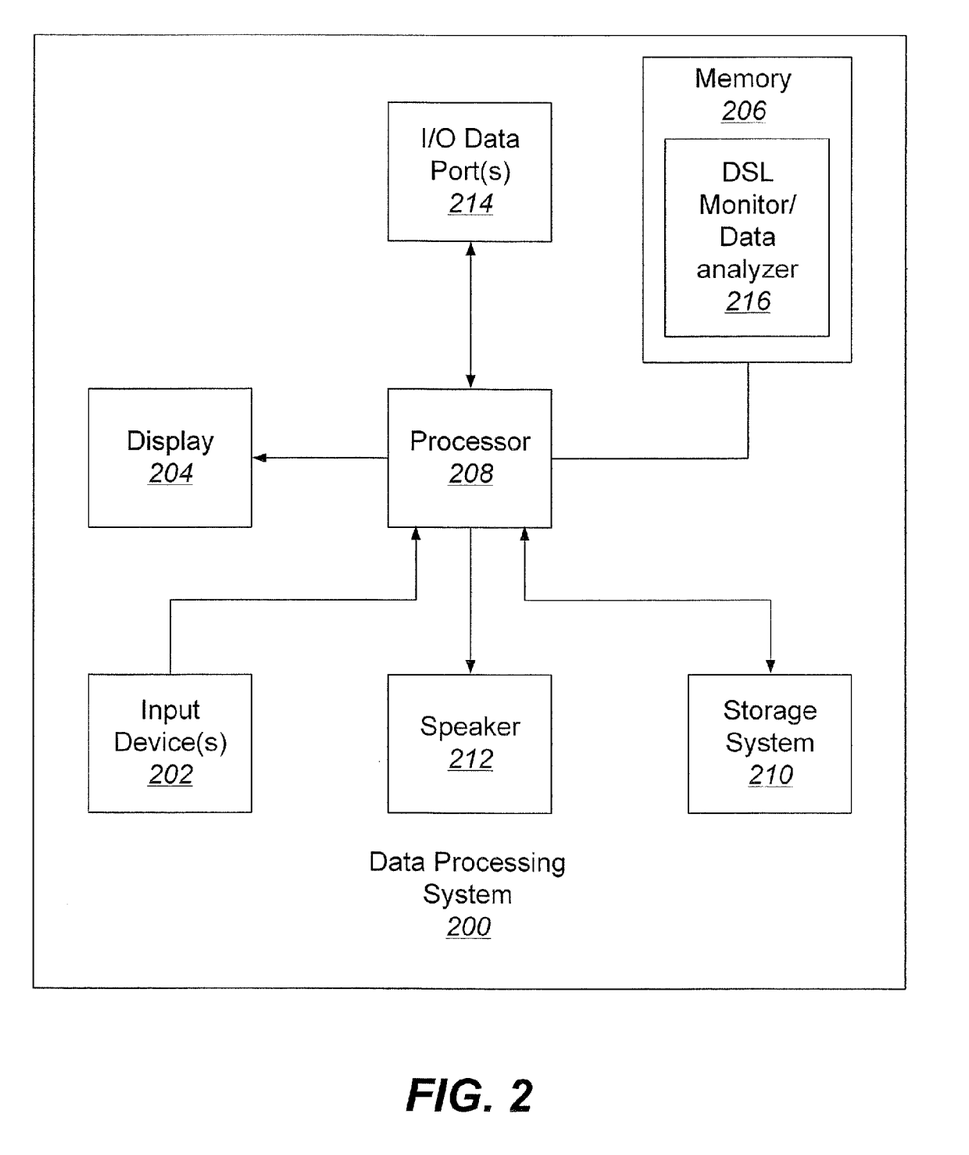
FIG. 2 is a block diagram of a data processing system that can be used to implement the DSL Access Multiplexer (DSLAM) monitor/controller of FIG. 1 in accordance with some embodiments of the present invention.

Referring now to FIG. 2, a data processing system 200 that may be used to implement the DSLAM monitor/controller 190 of FIG. 1, in accordance with some embodiments of the present invention, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a DSL monitor/data analyzer 216 that can be used to collect speed or data rate information from DSL lines terminating on a DSLAM and to analyze such data to determine if a line that is unable to sustain a provisioned data rate is likely due to an error in configuring the DSL modem and DSL filter at the customer premises.

Figure 3:
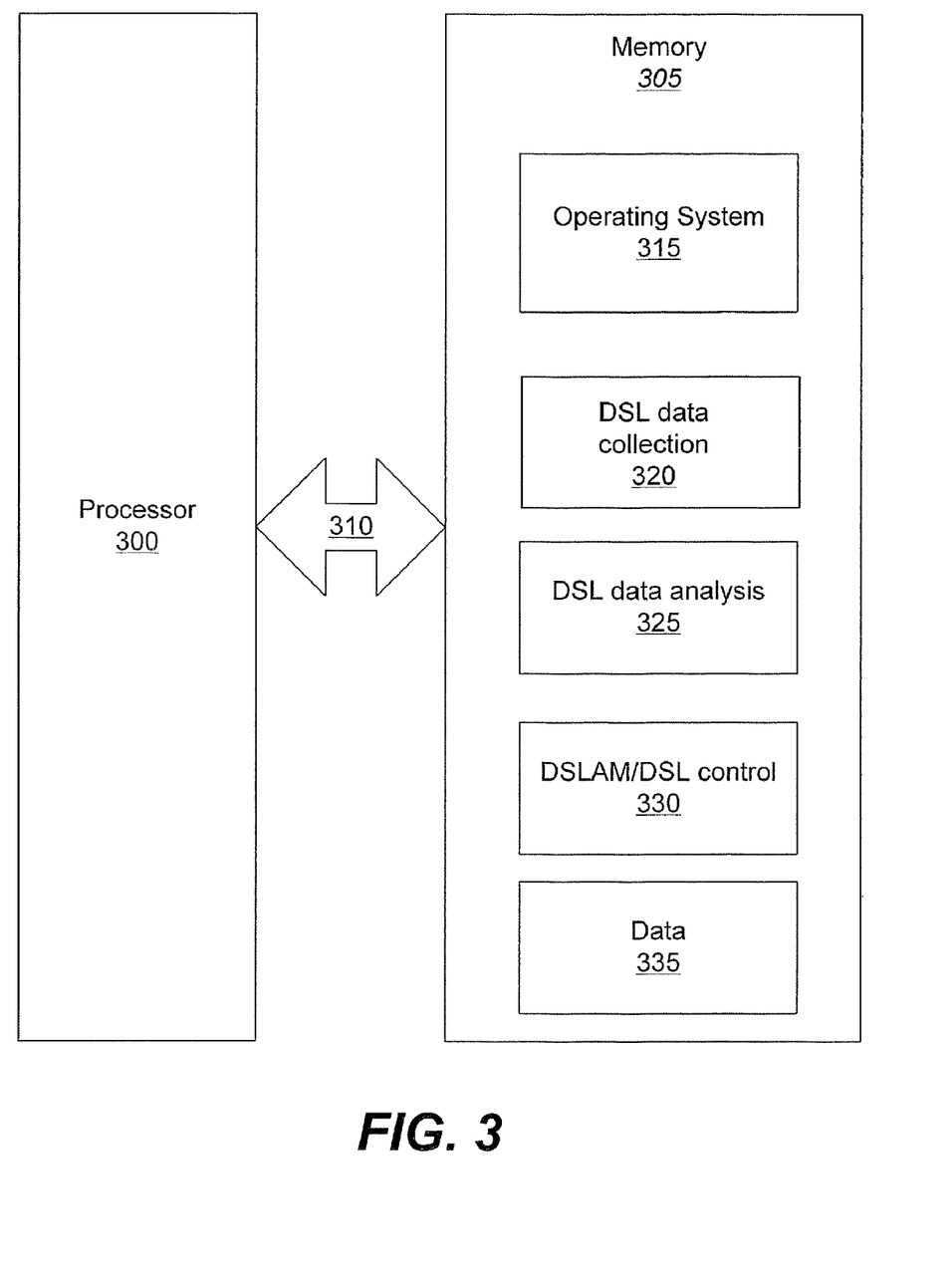
FIG. 3 is a block diagram of a hardware/software architecture for the DSLAM monitor/controller of FIG. 1 in accordance with some embodiments of the present invention.

FIG. 3 illustrates a processor 300 and memory 305 that may be used in embodiments of the DSLAM monitor/controller 190 of FIG. 1 and data processing system 200 of FIG. 2 in accordance with some embodiments of the present invention. The processor 300 communicates with the memory 305 via an address/data bus 310. The processor 300 may be, for example, a commercially available or custom microprocessor. The memory 305 is representative of the one or more memory devices containing the software and data used for monitoring DSL lines through a DSLAM and analyzing the collected data, in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain up to five or more categories of software and/or data: an operating system 315, a DSL data collection module 320, a DSL data analysis module 325, a DSLAM/DSL control module 330, and a data module 335. The operating system 315 generally controls the operation of the DSLAM monitor/controller. In particular, the operating system 315 may manage the DSLAM monitor/controller's software and/or hardware resources and may coordinate execution of programs by the processor 300. The DSL data collection module 320 may be configured to collect the speed or data rate information from DSLs terminated on a DSLAM. In accordance with various embodiments of the present invention, the data may be collected at intervals that may vary between about 15 minutes to 1 hour. The DSL data analysis module 325 may be configured to examine the collected data rates and compare them with the provisioned data rates for the respective lines. For lines that are determined to be operating under their provisioned data rate, the DSL data analysis module 325 communicates with the DSLAM/DSL control module 330 to trigger a reset of the DSLAM and/or the individual lines that are operating under their provisioned data rate. The DSL data analysis module 325 may also be configured to perform a statistical analysis on the patterns in the data rate information after one or more resets have been performed to evaluate whether a DSLs inability to achieve a provisioned data rate is likely due to an incorrect configuration between the DSL modem and DSL filter at the customer premises. The data module 335 represents the data collected by the DSL data collection module 320.

Although FIG. 3 illustrates exemplary hardware/software architectures that may be used in the DSLAM monitor/controller 190 of FIG. 1, it will be understood that the present invention is not limited to such a configuration but is intended to encompass any configuration capable of carrying out operations described herein. Moreover, the functionality of the data processing system 200 of FIG. 2 and the hardware/software architectures of FIG. 3 may be implemented as a single processor system, a multi-processor system, or even a network of stand-alone computer systems, in accordance with various embodiments of the present invention.

Computer program code for carrying out operations of data processing systems discussed above with respect to FIG. 2 and/or the software modules discussed above with respect to FIG. 3 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
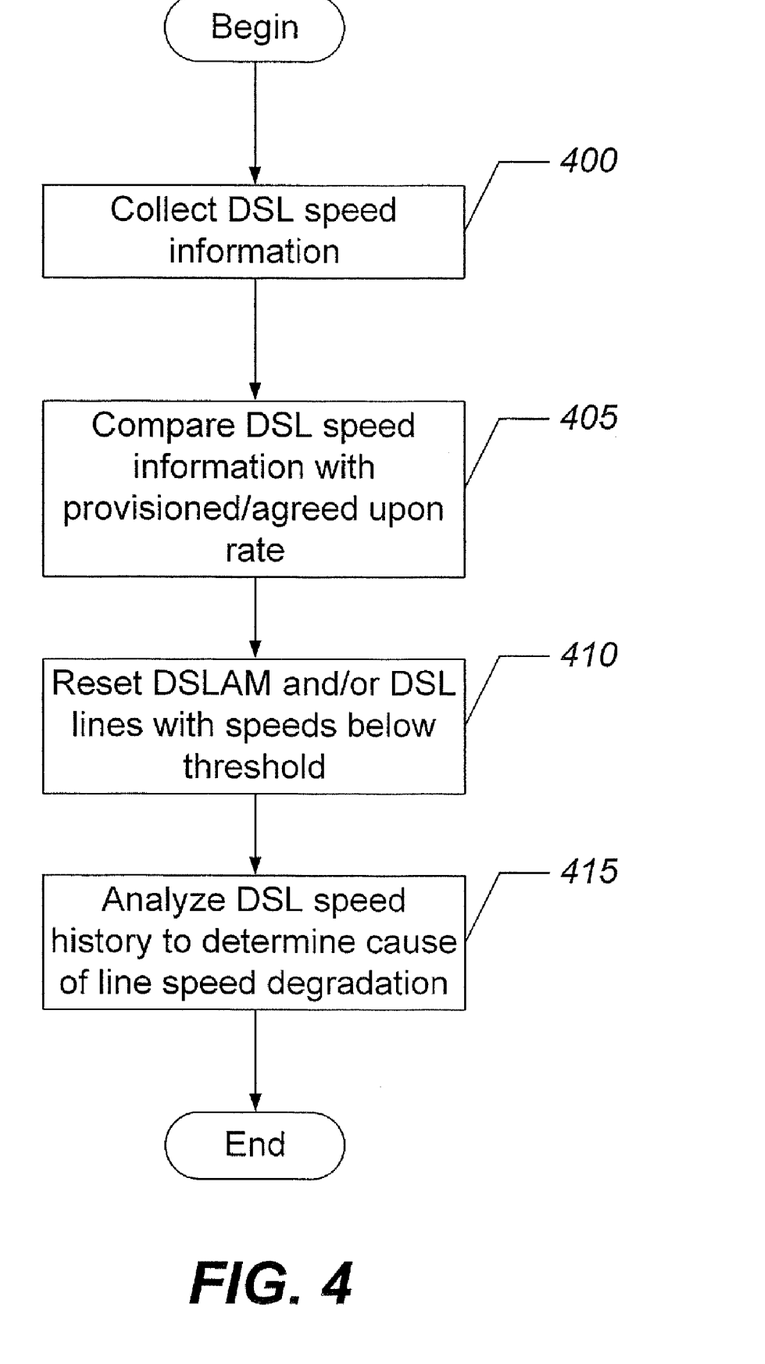
FIG. 4 is a flowchart that illustrates operations for detecting an incorrect digital subscriber line (DSL) modem and filter configuration at a customer premises in accordance with some embodiments of the present invention.

Exemplary operations for detecting an incorrect DSL modem and filter configuration at a customer premises will now be described. Operations begin at block 400 where the DSL data collection module 320 collects DSL speed or data rate information. At block 405, the DSL data analysis module 325 compares the DSL speed/data rate information with the provisioned and/or agreed upon (i.e., Service Level Agreement (SLA)) rates. For each line under the provisioned data rate or under a certain speed/data rate defined by a service provider, the DSLAM/DSL control module 330 sends a reset signal to the DSLAM that terminates the line to reset the DSLAM or the specific line at block 410. Upon resetting the DSLAM or DSL, the phase locked loops re-synchronize and a healthy line would be expected to synchronize at a higher speed. Lines with persistent noise problems and/or an incorrect DSL modem and DSL filter configuration at the customer premises would be expected to revert back to a low speed synchronization.

Figure 5:
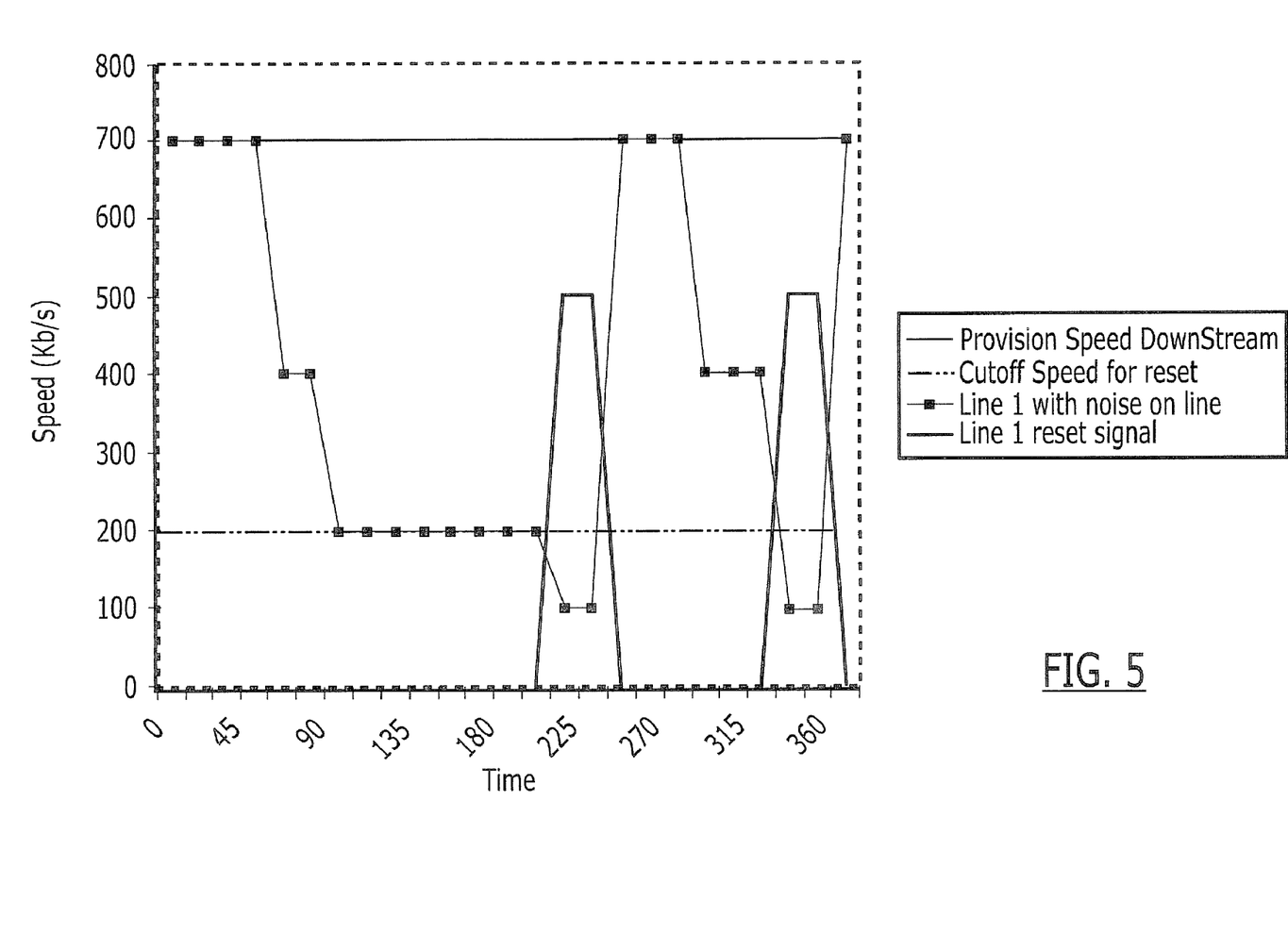
FIGS. 5-7 are graphs that illustrate example data collected by the DSLAM monitor/controller of FIG. 1 to detect an incorrect digital subscriber line (DSL) modem and filter configuration at a customer premises in accordance with some embodiments of the present invention.

FIG. 5 illustrates data collected for a line that is subject to non-persistent noise that lowers the data rate thereon. As shown at approximately time 225, a reset signal is triggered when the data rate falls below 200 Kbps resulting in the data rate returning to 700 Kbps. The data rate falls below 200 Kbps again at approximately time 360 resulting in another reset. Because the noise is not persistent, the line is able to sustain the provisioned data rate for a relatively long period of time.

Figure 6:
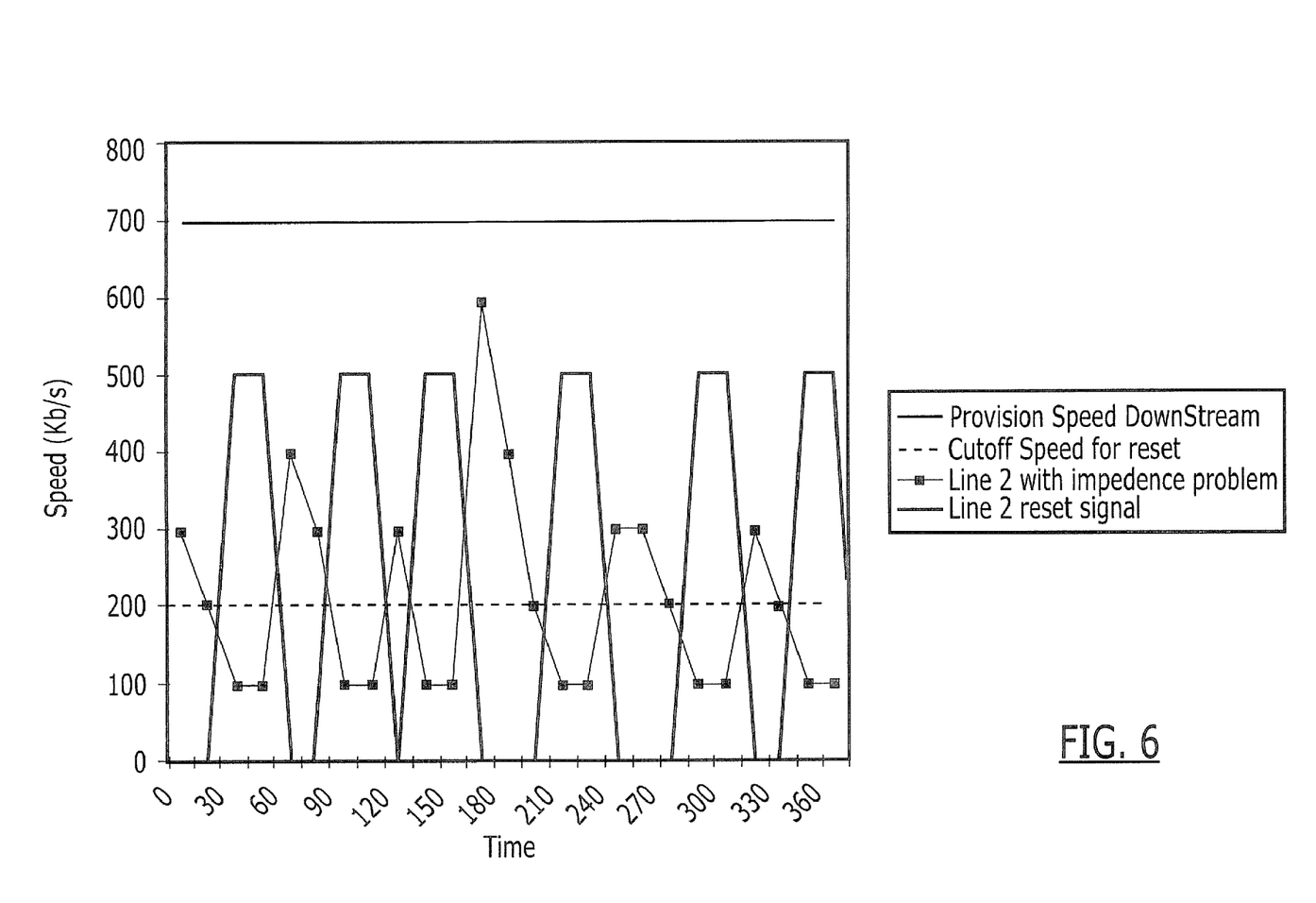

By contrast, FIG. 6 illustrates data collected for a line in which the DSL modem is connected to the voice port on the DSL filter. Each time the data rate falls below 200 Kbps a reset signal is triggered. The line is not, however, able to synchronize at the provisioned rate of 700 Kbps and quickly falls below 200 Kbps resulting in a series of resets.

Figure 7:
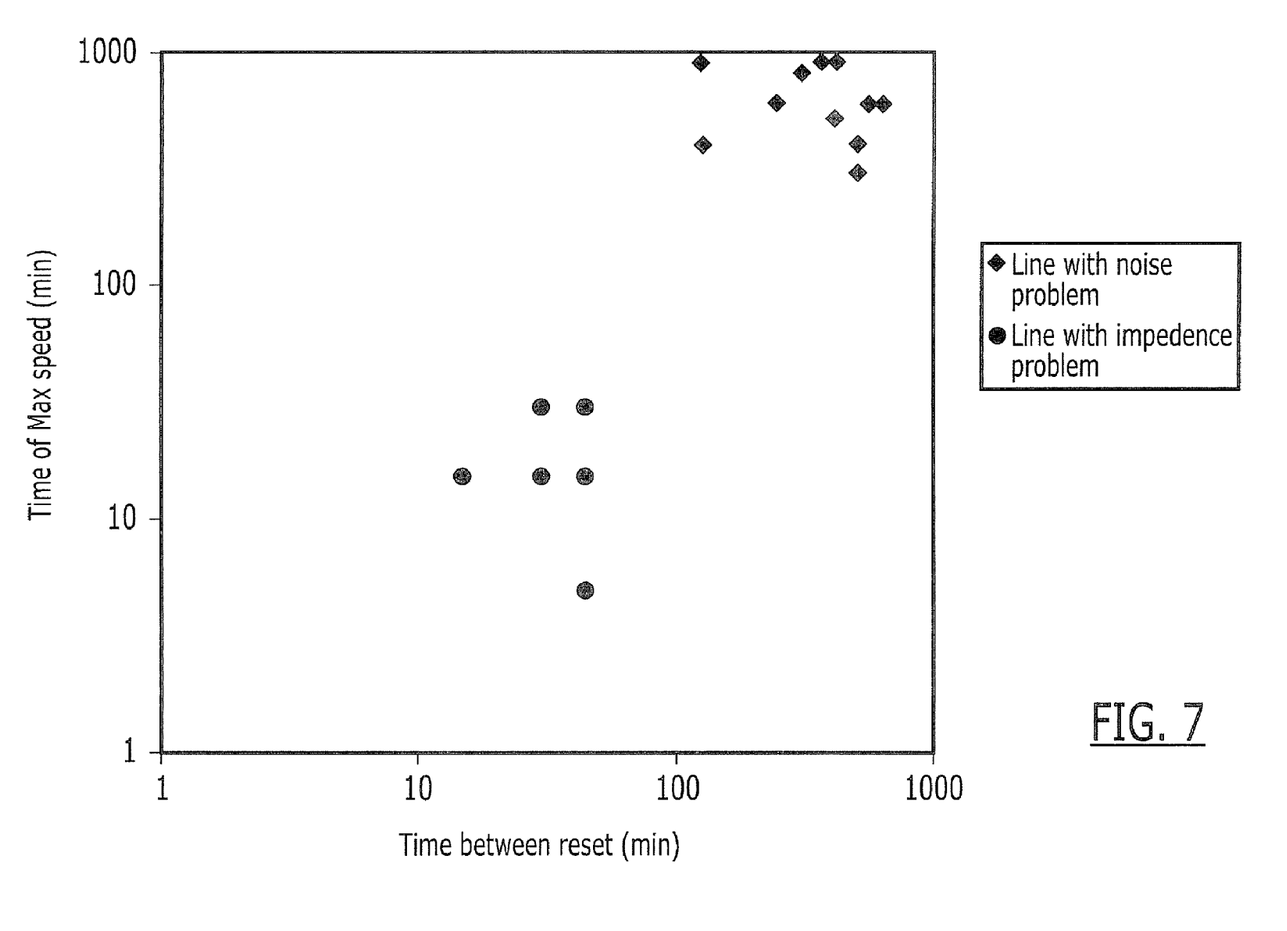

Returning to FIG. 4, at block 415, the DSL data analysis module 325 performs a Bayesian statistical analysis on the speed or data rate information collected for the various DSL lines. In particular embodiments, the data may be analyzed based on time at the provisioned data rate versus time between resets. As shown in FIG. 7, lines that suffer from transient noise problems have data that cluster at the upper right-hand corner of the graph, i.e., these lines are characterized by relatively long times at the provisioned data rate and relatively long times between resets. By contrast, lines in which the DSL modem is incorrectly connected to the voice port on the DSL filter suffer from a chronic impedance problem. These lines are characterized by shorter times at the provisioned data rate and shorter times between resets. For example, the DSL monitor/controller 190 may determine that the DSL modem is incorrectly installed if the time that the DSL provides service below the provisioned data rate and/or below a defined threshold is less than a defined threshold and/or if the times between resets is below a defined threshold.

Based on this statistical analysis of the mean and variance of each data cluster, a DSL service provider may be able to determine with a relatively high level of certainty whether a particular DSL line suffers an intermittent noise problem, which can be resolved by dispatching a technician to service the line or one or more remote resets, or whether the DSL line suffers from an impedance problem, which is likely due to a mistake by the customer in installing the DSL modem and DSL filter. Thus, embodiments of the present invention may provide automated detection of anomalies in DSL service as soon as they occur with no human intervention. Service may be restored to a higher quality in some cases without human intervention through the use of resets of the DSLAM and/or DSL line. Also, customer service may be notified to take proactive action by contacting a customer when it appears that a customer may have misconfigured the DSL modem and DSL filter when installing the equipment.

Many variations and modifications can be made to the embodiments described herein without substantially departing from the principles of the present invention. All such variations and modifications are intended to be included herein within the scope of the present invention, as set forth in the following claims.

That which is claimed:

1. A method of operating a communication network, comprising:
   collecting data rate information for at least one Digital Subscriber Line (DSL);
   comparing the collected data rate information with a provisioned data rate associated with the at least one DSL;
   resetting the at least one DSL if the collected data rate information for the at least one DSL is less than the provisioned data rate associated with the at least one DSL;
   performing a statistical analysis on time the at least one DSL operates at about the provisioned data rate versus time the at least one DSL operates below the provisioned data rate; and
   determining whether the at least one DSL has an impedance problem based on the statistical analysis.

2. The method of claim 1, wherein collecting data rate information comprises collecting data rate information at periodic intervals between about 15 minutes and about 1 hour.

3. The method of claim 1, wherein the at least one DSL terminates on a DSL Access Multiplexer (DSLAM) and wherein resetting the at least one DSL comprises resetting the at least one DSL without resetting the DSLAM.

4. The method of claim 1, wherein the at least one DSL terminates on a DSL Access Multiplexer (DSLAM) and wherein resetting the at least one DSL comprises resetting the DSLAM.

5. The method of claim 1, wherein resetting the at least one DSL comprises resetting the at least one DSL if the collected data rate information is less than a defined threshold.

6. The method of claim 1, wherein performing a statistical analysis comprises performing a Bayesian statistical analysis.

7. The method of claim 1, wherein performing the statistical analysis comprises:
   performing a statistical analysis on the time the at least one DSL operates at about the provisioned data rate and time between resets of the at least one DSL.

8. The method of claim 7, wherein determining whether the at least one DSL has an impedance problem comprises determining that the time that the at least one DSL operates at about the provisioned data rate is less than a first time threshold and that the time between resets of the at least one DSL is less than a second time threshold.

9. The method of claim 1, wherein determining that the at least one DSL has an impedance problem comprises determining that the at least one DSL has an incorrectly installed modem and/or filter connected thereto.

10. A computer program product comprising a computer readable medium having computer readable program code embodied therein, the computer readable program code being configured to implement the method of claim 1.

11. A monitoring system for a communication network, comprising:
 a Digital Subscriber Line (DSL) monitor that is configured to collect data rate information for at least one DSL, compare the collected data rate information with a provisioned data rate associated with the at least one DSL, reset the at least one DSL if the collected data rate for the at least one DSL is less than the provisioned data rate associated with the at least one DSL, perform a statistical analysis on time the at least one DSL operates at about the provisioned data rate versus time the at least one DSL operates below the provisioned data rate, and determine whether the at least one DSL has an impedance problem based on the statistical analysis.

12. The system of claim 11, wherein the DSL monitor is configured to collect data rate information at periodic intervals between about 15 minutes and about 1 hour.

13. The system of claim 11, wherein the at least one DSL terminates on a DSL Access Multiplexer (DSLAM) and wherein the DSL monitor is configured to reset the at least one DSL without resetting the DSLAM.

14. The system of claim 11, wherein the at least one DSL terminates on a DSL Access Multiplexer (DSLAM) and wherein the DSL monitor is configured to reset the at least one DSL while resetting the DSLAM.

15. The system of claim 11, wherein the DSL monitor is configured to reset the at least one DSL if the collected data rate information is less than a defined threshold.

16. The system of claim 11, wherein the DSL monitor is configured to perform the statistical analysis by performing a Bayesian statistical analysis.

17. The system of claim 11, wherein the DSL monitor is further configured to perform a statistical analysis on the time the at least one DSL operates at about the provisioned data rate and time between resets of the at least one DSL.

18. The system of claim 17, wherein the DSL monitor is further configured to determine whether the at least one DSL has an impedance problem by determining that the time that the at least one DSL operates at about the provisioned data rate is less than a first time threshold and that the time between resets of the at least one DSL is less than a second time threshold.

19. The system of claim 11, wherein the DSL monitor is further configured to determine that the at least one DSL has an impedance problem by determining that the at least one DSL has an incorrectly installed modem and/or filter connected thereto.

* * * * *